Oct. 9, 1928.
K. O. SCHAUMAN
1,686,535
CABLE BUMPER
Filed May 10, 1926
3 Sheets-Sheet 1
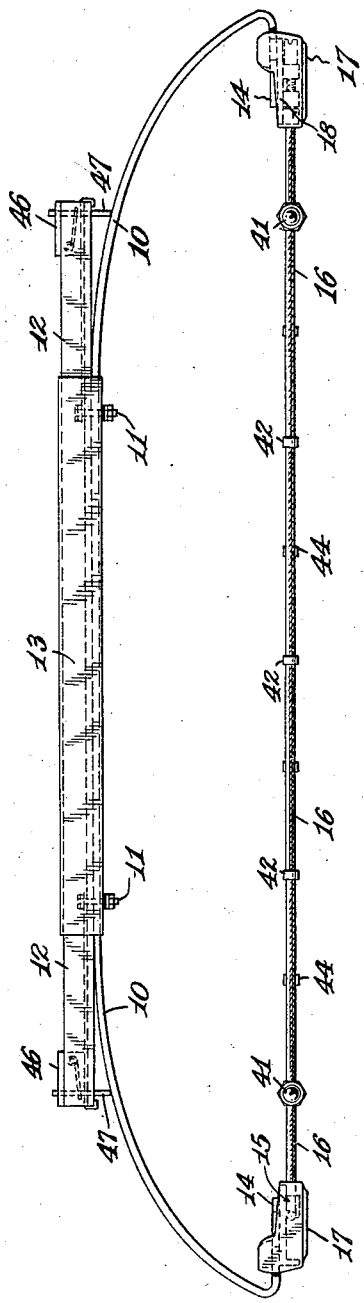
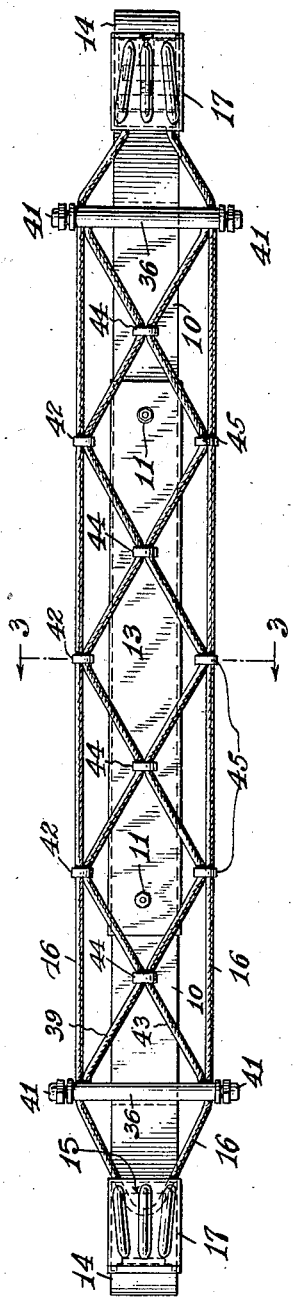
Inventor
Karl Osten Schauman,
By his Attorney Oct. 9, 1928.   1,686,535
K. O. SCHAUMAN
CABLE BUMPER
Filed May 10, 1926   3 Sheets-Sheet 2
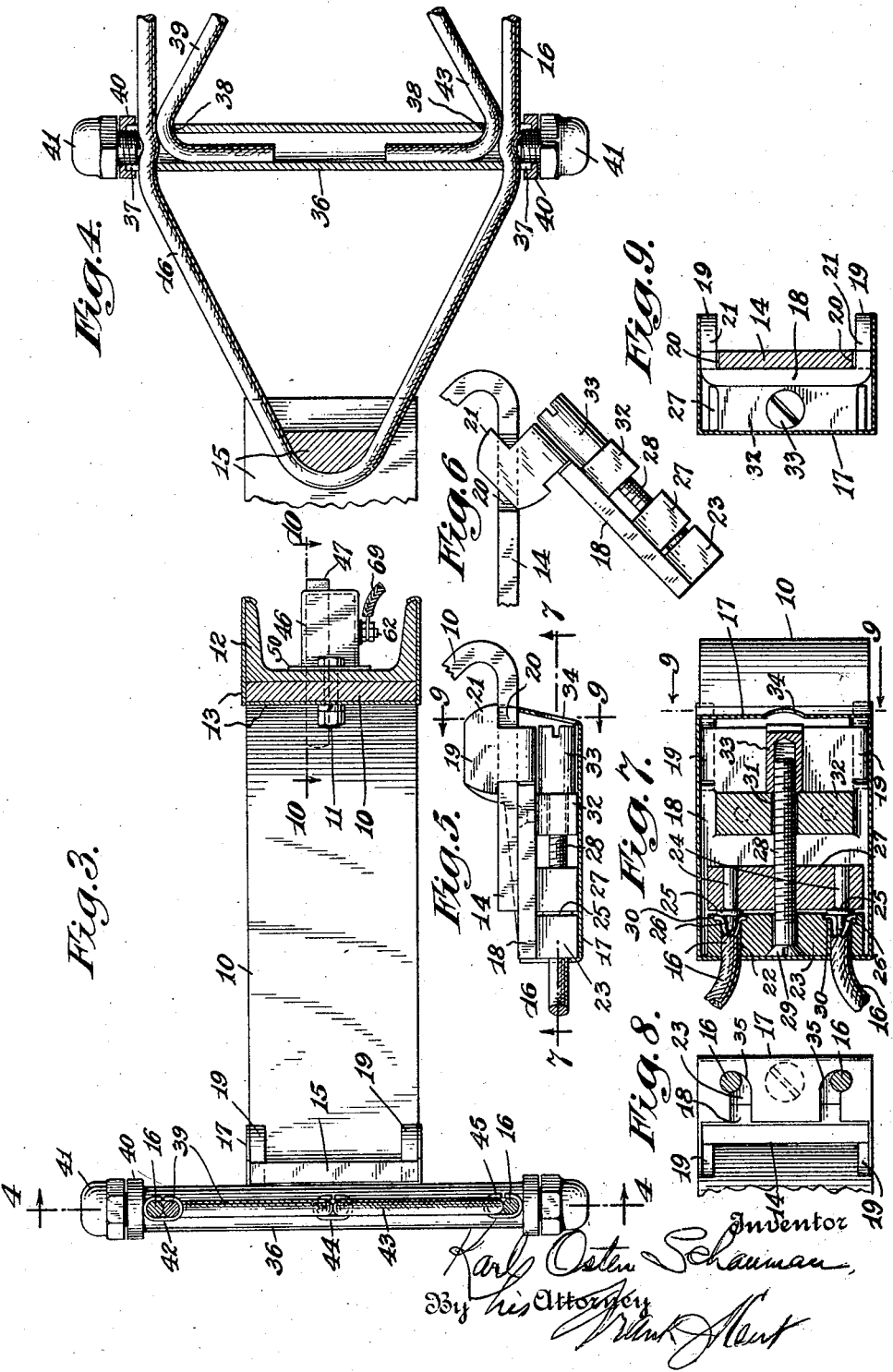

Oct. 9, 1928.
K. O. SCHAUMAN
CABLE BUMPER
Filed May 10, 1926      3 Sheets-Sheet 3
1,686,535
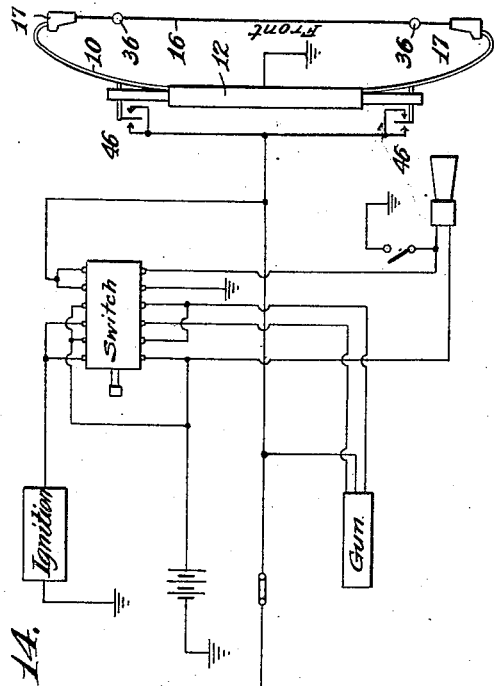
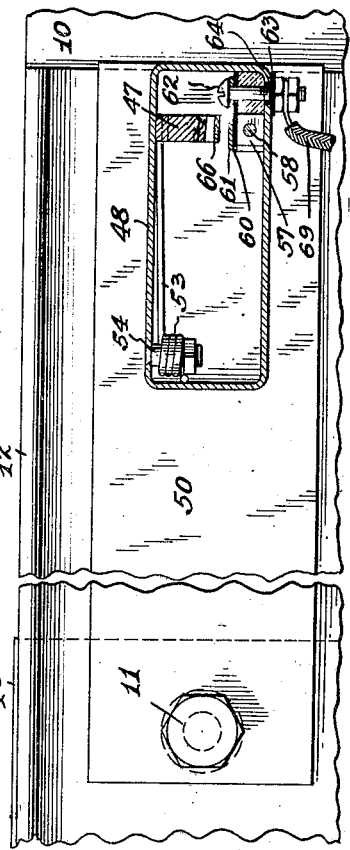
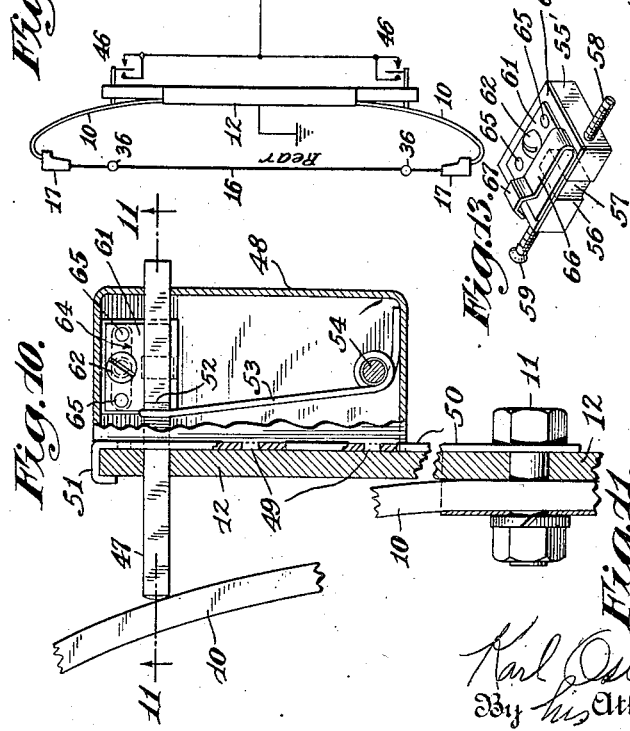
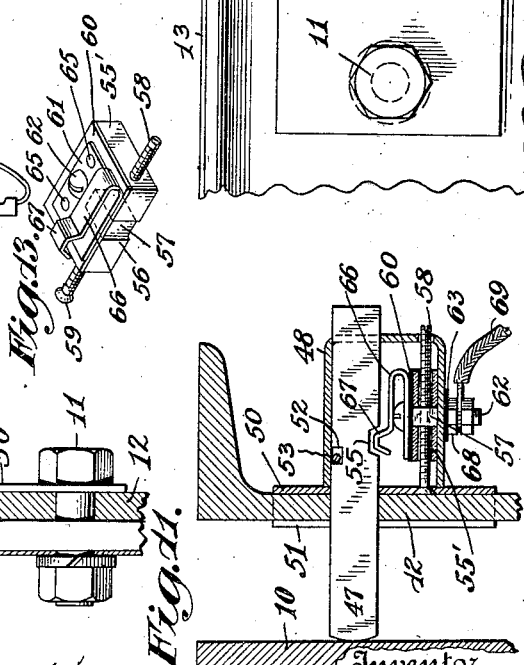
Inventor
Karl Osten Schauman
By his Attorney Patented Oct. 9, 1928.

1,686,535

UNITED STATES PATENT OFFICE.

KARL OSTEN SCHAUMAN, OF NEW YORK, N. Y., ASSIGNOR TO WILLIAM HENRY AVERY, OF SAN FRANCISCO, CALIFORNIA.

CABLE BUMPER.

Application filed May 10, 1926. Serial No. 108,118.

This invention relates to a bumper for automobiles and aims to provide a structure that will afford efficient protection from shocks and which will be of neat appearance and simple construction. The invention further aims to provide inconspicuous electrical contact members so associated with the bumper that they will be moved to complete an electrical circuit whenever the bumper collides with an obstruction.

The bumper includes a bow-shaped member across which is strung a network of flexible cables. The electrical contacts are controlled by spring-pressed sliding members which move whenever any part of the bumper receives a blow, thereby closing the contacts and causing the operation of certain mechanism controlling the movement of the automobile.

While I have disclosed a preferred embodiment for purposes of illustration, it should be understood that various changes and modifications in the structure may be made without departing from the spirit and scope of the invention as hereinafter set forth and claimed.

In the drawings:

Fig. 1 is a top plan view of the bumper;

Fig. 2 is a front elevation thereof;

Fig. 3 is a central vertical cross section on the line 3—3 in Fig. 2 and on larger scale;

Fig. 4 is a detail section through one of the spreader members as indicated on the line 4—4 in Fig. 3;

Fig. 5 is a top plan view of the cable tightening means located on the right in Fig. 1, the metal cover being shown in section;

Fig. 6 is a similar view but with cover removed and showing the anchor piece rotated to a position where it can be removed from the bumper;

Fig. 7 is a vertical section on the line 7—7 of Fig. 5;

Fig. 8 is an end view of Fig. 7 as viewed from the left;

Fig. 9 is a transverse section on the line 9—9 of Fig. 7;

Fig. 10 is a horizontal section through one of the switches as indicated on the line 10—10 in Fig. 3;

Fig. 11 is a vertical section on the line 11—11 in Fig. 10;

Fig. 12 is an elevation of the parts shown in Figs. 10 and 11 the case of the switch being in section;

Fig. 13 is a perspective view of the adjustable terminal of the switch; and

Fig. 14 is a diagram of the front and rear bumpers with electrical connections to other apparatus.

Referring to the drawings more specifically, the main part of the bumper is the bow-shaped member 10 which is secured by bolts 11 to the channel bar 12, the latter being secured to the automobile in any well-known manner. An ornamental cover 13 is placed over the parts of the bow member 10 and channel bar 12 contacting with each other.

The outer ends of bow member 12 are bent inwardly toward each other to form extensions 14 parallel with the channel bar 10. The right-hand extension 14 carries the adjustable cable anchor 18. The anchor 18 is formed with a pair of headed lugs 19 extending into open notches 20 cut into the sides of the bumper. One side of the head of each of lugs 19 has an extension as at 21 which must be slipped into notch 20 as shown in Fig. 6 and which prevents disengagement of the anchor when in holding position as shown in Fig. 5. An anchor member 15 is similarly attached to the left hand extension 14 and holds the looped end of cable loop 16, as shown in Figs. 1 and 2, the attachment being concealed by an ornamental cover 17 having bayonet slots 35 engaging the cables as shown in Fig. 8.

The free ends of the cable loop 16 are secured to the anchor member 18 as shown in Figs. 5 and 7. Each end of the cable passes into a hole 22 formed in a block 23. A pair of loose pins 24 having disc flanges 25 and projecting tapered points 26 are loosely mounted in a block 27 and situated so as to be directly opposite the holes 22. A screw 28 passes loosely through block 23 and is threaded into block 27, so that upon tightening up head 29 of the screw, the tapered pins are jammed into the ends of the cable and the flanges 25 press the cable strands into the counter bores 30, thereby firmly anchoring the cable ends to block 23. The inner end of screw 28 passes through an opening 31 in a lateral flange 32 carried by anchor member 18 and receives an adjusting nut 33. It will be clear that by screwing the adjusting nut down the block 23 will be moved toward the right of Fig. 7, thereby tightening the cable. The anchor member 18 is also protected by an ornamental cover 17 which is provided with an opening 34 to permit access to the adjusting nut.

Near each extension 14 the strands of the cable loop 16 are held apart by spreaders 36. As shown in Fig. 4 the spreader is a tube member slotted at its upper end at 37 to receive the upper strand of loop 16, the right hand side of the slot being extended at 38 to permit the insertion of the end of the upper cross cable 39 into the tube. A cap 40 is placed over the end of the spreader to hold it together and a clamp screw 41 is threaded into the end of the tube to securely grip the cables. Each end of each of the spreaders is similarly formed. The upper cross cable member 39 is anchored in the upper end of each of the spreaders, and is attached to the upper strand of loop 16 at spaced points by clips 42 and to the lower cross cable member 43 by clips 44 at points midway between the clips 42. The lower cross cable member 43 is secured to the lower strand of loop 16 by clips 45 at points opposite the clips 42. This structure forms a symmetrical network of flexible cables across the open front of bow member 10.

Just inside of each end of the channel bar 12 is located a contact switch 46 having a sliding arm 47 extending through an aperture in the channel bar and contacting with the bow member 10. The switch is inclosed in a one-piece casing 48 riveted at 49, Fig. 10, to a supporting plate 50 which has one end hooked over the end of the channel bar at 51 and the other end clamped by the bolt 11. The sliding arm 47 extends through openings in the casing and within the casing is provided on its upper side with a notch 52 which receives one end of a spring 53. The opposite end of spring 53 is coiled about a stud 54 carried by the casing and has its end engaging one side of the casing to thereby resiliently press the arm 47 into contact with the bow member 10.

The lower side of arm 47 is formed with an elongated notch 55. An adjustable normally stationary contact member is mounted in the casing for cooperation with the sliding arm 47. The main part of this stationary contact is a block of fiber 55' having a square opening 56 receiving a square nut 57, Figs. 11 and 13. An adjusting screw 58 has a countersunk head 59 swiveled in the supporting plate 50 and held against longitudinal movement by the channel bar 12. The screw 58 extends freely through the block 55', is screw-threaded through the nut 57 and has its free end kerfed and extended through an opening in the casing. A fiber plate 60 is laid over the block 55' and a contact piece 61 is placed on top of the plate 60. A binding bolt 62 passes through piece 61, plate 60, block 55', and fiber bushing 63 fitting into a slot 64 formed in the lower wall of the casing. Rivets 65 hold the contact piece against rotation upon the sliding block. A resilient arm 66 formed on the contact piece has a raised head portion 67 adapted normally to extend into the notch 55 without touching the arm 47 as shown in Fig. 11. The adjusting screw 58 provides means for moving block 55' laterally to place the head 67 in proper relation to the notch 55. The block is then secured in this position by tightening the nut 68, and the conductor wire 69 is secured to the binding bolt 62 and led to the positive terminal of the battery through appropriate circuits.

It will be clear from Figs. 1 and 10 that whenever the bumper receives an impact the arm 47 will contact with the head 67. If the blow is received in the cable network the sides of the bow will be pulled toward each other, permitting spring 53 to move the bolt forward, while if the blow is received by one of the forward extensions of the bow the corresponding arm 47 will be pushed toward the rear. In either case head 67 will contact with a side of the notch 55.

Fig. 14 indicates how front and rear bumpers of the type herein disclosed can be used in the automatic control system disclosed in my copending application Serial No. 102402 filed on April 16, 1926. The channel bar 12 of each bumper is grounded, and since the sliding arm 47 is in electrical contact with the channel bar, whenever arm 47 contacts with head 67, operating circuits of the control system will be completed depending upon the position of the switch member, as set forth in said copending application.

I claim:

1. A cable bumper comprising a bow member, an anchor secured to one end of the bow member, an adjustable anchor secured to the other end of the bow member, and a cable loop passing around the first anchor and having its end attached to the adjustable anchor.

2. A cable bumper comprising a channel bar, a bow member attached to said channel bar, an anchor secured to one end of the bow member, an adjustable anchor secured to the other end of the bow member, and a cable loop passing around the first anchor and having its ends attached to the adjustable anchor.

3. A cable bumper comprising a channel bar, a bow member having its central portion attached to the channel bar and its end portions bent to form inward extensions, notches formed on opposite sides of the extensions, anchors having lugs engaging the notches, and a cable member secured to the anchors.

4. A cable bumper comprising a channel bar, a bow member having its central portion attached to the channel bar and its end portions bent to form inward extensions, notches formed on opposite sides of the extensions, an anchor engaging the notches of one extension, an adjustable anchor engaging the notches of the other extension, and a cable loop passing around the first anchor and having its ends attached to the adjustable anchor.

5. A cable bumper comprising a main bumper member, a cable loop passing over a part carried by one end of the bumper member, the ends of the cable passing through holes in a block, tapered pins carried by a second block, means for clamping the blocks together to cause the tapered pins to spread the cable ends, thereby anchoring the cable ends in said first block, and means for securing the blocks to the opposite end of the bumper member.

6. A cable bumper comprising a main bumper member, a cable loop passing over a part carried by one end of the bumper member, the ends of the cable passing through holes in a block, tapered pins carried by a second block, a screw swiveled through the first block and threaded through the second block, said screw passing through a flange carried by the other end of the bumper and receiving an adjusting nut, and an ornamental cover concealing the attachment of the cable to the bumper at each end.

7. A cable bumper comprising a bow member, a cable loop secured to opposite ends of the bow member, a spreader placed in the loop near each end of the loop, and cross cable members having their ends anchored in the spreaders.

8. A cable bumper comprising a main bumper member, a cable loop secured to opposite ends of the bumper member, a spreader placed in the loop near each end of the loop, an upper cross cable member and a lower cross cable forming a network across said cable loop, each end of each spreader having means for clamping the cable loop and an end of a cross cable member.

9. A cable bumper comprising a main bumper member, a cable loop secured to opposite ends of the bumper member, a tubular spreader placed in the loop near each end of the loop, an upper cross cable member and a lower cross cable forming a network across said cable loop, each end of each spreader being split to receive the cable loop and an end of a cross cable member, a cap surrounding the split end of the spreader, and a screw threaded into the split end to clamp the cables.

In testimony whereof I affix my signature.

KARL OSTEN SCHAUMAN.